United States Patent Office 2,986,556
Patented May 30, 1961

2,986,556

FLUORINE-CONTAINING COPOLYMERS

Elizabeth S. Lo, Fords, N.J., assignor, by mesne assignments, to Minnesota Mining and Manufacturing Company, St. Paul, Minn., a corporation of Delaware No Drawing. Filed Sept. 27, 1956, Ser. No. 612,353

19 Claims. (Cl. 260—87.5)

This invention relates to halogen-containing copolymeric compositions. In one aspect, the invention relates to fluorine-containing copolymeric compositions. More particularly, in this aspect, the invention relates to elastomeric fluorine-containing copolymeric compositions and the method for their manufacture.

It is an object of this invention to provide new and useful fluorine-containing copolymeric compostions having desirable chemical and physical characteristics.

Another object of this invention is to provide new and useful fluorine-containing copolymeric compositions possessing elastomeric properties, together with good chemical and physical characteristics, and which can be easily fabricated into a wide variety of useful articles of improved chemical and physical stability.

Still another object of this invention is to provide new and useful fluorine-containing copolymeric compositions serving as protective coatings having the aforementioned characteristics and which can be readily applied to the surfaces of a wide variety of useful articles.

A still further object of the invention is to provide a process for producing these copolymeric compositions in good yields.

Various other objects and advantages inherent in the invention will become apparent to those skilled in the art from the accompanying description and disclosure.

It has now been found that the copolymerization of trifluorobutadiene and a fluorinated ethylene, under the conditions more fully hereinafter described, produces an elastomeric copolymeric composition possessing good chemical and physical stability, and good resistance to oils, fuels and various strong chemical reagents. These copolymeric products of a trifluorobutadiene and a fluorinated ethylene, constitute valuable macromolecules and are adaptable to a wide variety of commercial uses. They possess low-temperature flexibility, in addition to the aforementioned properties of good chemical and physical stability and resistance to oil and hydrocarbon fuels. They are also selectively soluble in various commercial solvents and serve as durable, flexible, protective coatings on surfaces which are subjected to environmental conditions in which they may come into contact with any of the aforementioned corrosive substances.

The trifluorobutadienes which are copolymerized with the fluorinated ethylene include 1,1,2-trifluorobutadiene and 1,1,3-trifluorobutadiene. The fluorinated ethylene comonomers, which are copolymerized with the trifluorobutadienes, include 1,1-dichloro-2,2-difluoroethylene, 1-chloro-1-fluoroethylene, perfluoroethylene, 2-chloro-1,1-difluoroethylene, trifluoroethylene, vinyl fluoride and vinylidene fluoride.

The 1,1,2-trifluorobutadiene monomer is obtained by adding dibromofluoromethane to 1-fluoropropene to produce the adduct $CF_2BrCHFCHBrCH_3$, which, upon dehydrobromination, yields $CF_2=CFCH=CH_2$, B.P. 4.8° C.–8.0° C. 1-fluoropropene is prepared by the following series of reactions:

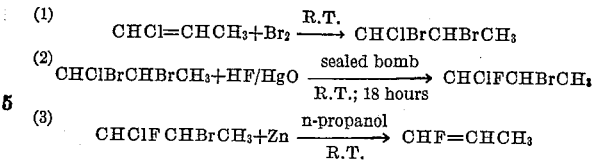

The 1,1,3-trifluorobutadiene monomer is obtained by adding dibromodifluoromethane to 2-fluoropropene to produce the adduct, $CF_2BrCH_2CFBrCH_3$, which is then dehydrobrominated at about 150° C. using tri-n-butyl amine to yield $CF_2=CH-CF=CH_2$, B.P. 17.5° C.–19.4° C. 2-fluoropropene is prepared by the following series of reactions:

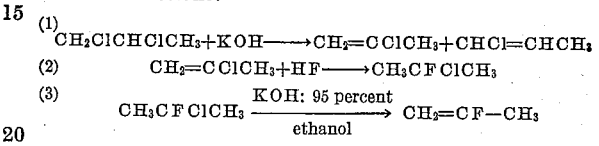

In general, as more fully hereinafter described, the copolymeric compositions of the present invention are produced from the polymerization of monomeric mixtures containing the trifluorobutadiene and the fluorinated ethylene at temperatures between about −20° C. and about 120° C., with intermediate temperature ranges being selected with reference to the specific polymerization system employed. The most useful elastomeric copolymeric compositions are produced from monomeric mixtures containing between about 10 mole percent and about 70 mole percent of the trifluorobutadiene and the remaining major constituent being any of the aforementioned fluorinated ethylene monomers. The preferred elastomeric copolymeric compositions of the present invention are copolymers produced from monomeric mixtures containing between about 25 mole percent and about 60 mole percent of the trifluorobutadiene and the remaining major constituent being any of the aforementioned fluorinated ethylene comonomers.

In producing elastomeric copolymeric compositions from the aforementioned monomeric mixtures containing between about 10 mole percent and about 70 mole percent of the trifluorobutadiene and the remaining major constituent being any of the aforementioned comonomers, it is found that the finished elastomeric product contains between about 50 mole percent and about 99 mole percent of the trifluorobutadiene and the remaining major constituent being any of the aforementioned comonomers. In producing elastomeric copolymeric compositions from the aforementioned monomeric mixtures containing between about 25 mole percent and about 60 mole percent of the trifluorobutadiene and the remaining major constituent being any of the aforementioned comonomers, it is found that the finished elastomeric product contains between about 60 mole percent and about 90 mole percent of the trifluorobutadiene and the remaining major constituent being any of the aforementioned comonomers.

The elastomeric polymeric compositions of the present invention are preferably prepared by carrying out the polymerization reaction in the presence of a free-radical promoter. For this purpose, the polymerization reaction is carried out by employing a water-soluble peroxy type initiator in a water-suspension type recipe or an organic peroxide initiator in a bulk-type system. The water-suspension type recipe system is preferred.

The water-suspension type system contains a water-soluble peroxy-type initiator, which is preferably present in the form of an inorganic persulfate such as potassium persulfate, sodium persulfate or ammonium persulfate. In addition, the water-suspension type recipe system may also contain, in some instances, a variable-valence metal salt, for example, an iron salt such as ferrous sulfate or ferrous nitrate to accelerate the copolymerization reaction. The water-soluble initiator present in the water-suspension type recipe system comprises between about 0.1 and about 5 parts by weight per 100 parts of total monomers present. The variable-valence metal salt is preferably employed in an amount between about 0.01 and about 0.2 part by weight per 100 parts of total monomers present. It is also desirable, in some instances, in these water-suspension type recipe systems, that a reductant be present, preferably in the form of a bisulfite, such as sodium bisulfite, potassium bisulfite, sodium metabisulfite or potassium metabisulfite. The reductant comprises between about 0.05 and about 5 parts by weight per 100 parts of total monomers present; perferably the reductant comprises between about 0.1 and about 2 parts by weight per 100 parts of total monomers present.

In these water-suspension type recipe systems, it is desirable to employ an emulsifying agent. This emulsifying agent is present either in the form of a metallic salt of an aliphatic acid having from 14 to 20 carbon atoms per molecule, or in the form of a halogenated-organic acid or salts thereof, having from 6 to 18 carbon atoms per molecule. A typical example of the former is potassium stearate. Typical examples of the halogenated-organic acid or salts thereof, serving as emulsifying agents in the above-mentioned water-suspension type recipe systems, are polyfluorocarboxylic acids (e.g., perfluorooctanoic acid) or perfluorochlorocarboxylic acid salts (e.g., trifluorochloroethylene telomer acid soaps). The polyfluorocarboxylic acids which may be employed are such as those disclosed in U.S. Patent No. 2,559,752; and the non-acidic derivatives of the acids disclosed therein as being effective dispersing agents may also be used in the process of the present invention. The perfluorochlorocarboxylic acid salts which may be used in accordance with this invention are those disclosed in co-pending application Serial No. 501,782, filed April 18, 1955, Patent No. 2,806,867, as being useful dispersing agents in polymerization reactions. In general, these emulsifying agents are present in an amount between about 0.5 and about 10 parts by weight per 100 parts of total monomers present.

The polymerization reaction is preferably conducted under neutral conditions. It is desirable, therefore, that the pH be maintained between about 7.0 and 9.0 in order to prevent gelling of the resulting polymeric product, a condition which often causes slowdown or stoppage of the polymerization reaction. In this respect, it should be noted that it is sometimes necessary to maintain the pH of the system within the aforementioned pH limits by the addition of suitable buffer agents. Typical examples are sodium borate and disodium phosphate.

As indicated above, the polymerization reaction may also be carried out with the initiator being present in the form of an organic peroxide in a bulk-type polymerization system. Of these organic peroxide promoters, halogen-substituted peroxides are most desirable. A preferred promoter of this type is trichloroacetyl peroxide. Other halogen-substituted organic peroxides for carrying out the polymerization reaction are trifluorodichloropropionyl peroxide, trifluoroacetyl peroxide, difluoroacetyl peroxide, trichloroacetyl peroxide, 2,4-dichlorobenzoyl peroxide and dichlorofluoroacetyl peroxide, benzoyl peroxide and di-tertiary butyl peroxide.

As previously indicated, the polymerization reaction is carried out, in general, at a temperature between about −20° C. and about 120° C. When the polymerization reaction is carried out employing a water-suspension type recipe, temperatures between about 0° C. and about 75° C. are preferably employed. When the polymerization reaction is carried out in the presence of an organic peroxide initiator in a bulk-type polymerization system, temperatures over the entire range of between about −20° C. and about 120° C. are employed, and preferably between about −20° C. and about 75° C., depending upon the decomposition temperature of the promoter. The polymerization reactions described herein to produce the polymeric compositions of the present invention are carried out under autogenous conditions of pressure.

As previously indicated, the copolymers of the present invention are particularly suitable and useful for the fabrication of a wide variety of materials having highly desirable physical and chemical properties. In this respect, the copolymers of the present invention possess important utility in the fabrication of resilient gaskets, seals, valve-diaphragms, films and various other commercial applications. Another important use of the copolymers of the present invention is in the form of durable, flexible, protective coatings on surfaces which are subjected to distortion in normal use, e.g., fabric surfaces. For these purposes, the copolymers of the present invention may be dissolved in various commercial solvents. Particularly useful solvents comprise the aliphatic and aromatic esters, ketones and halogenated hydrocarbons. Typical examples of these solvents are di-isobutyl ketone, methyl ethyl ketone, methyl isobutyl ketone, ethyl acetate and 1,1,2-trifluorotrichloroethane. In this respect, it should be noted that it is often desirable to regulate the molecular weight of the polymeric compositions of the present invention in order to obtain greater solubility in organic solvents. It is found that the addition of various polymerization modifiers appreciably reduces the molecular weight of the polymeric compositions and increases their solubility, without affecting, unduly, the overall yield. Suitable polymerization modifiers include chloroform ($CHCl_3$), Freon-113 ($CF_2ClCFCl_2$), carbon tetrachloride ($CCl_4$), trichloroacetyl chloride ($CCl_3COCl$)

bromotrichloromethane ($CBrCl_3$), dodecyl mercaptan ($C_{12}H_{25}SH$) and mixed tertiary mercaptans. These modifiers are preferably added in amounts between about 0.01 and about 10 parts by weight per 100 parts of total monomers charged to the polymerization reaction. Chloroform is preferred.

The following examples are offered for a better understanding in producing the copolymeric composition of the present invention and are not to be construed as limiting its scope.

*Example 1*

A heavy-walled glass polymerization tube of about 20 ml. capacity was flushed with nitrogen and then charged with 5 cc. of a solution prepared by dissolving 0.1 gram of dodecyl mercaptan and 6 grams of the ammonium salt of perfluorooctanoic acid in 100 cc. of water. The contents of the tube were then frozen, and the tube was then charged with 1 cc. of a promoter solution prepared by dissolving 0.4 gram of sodium metabisulfite and 0.5 gram of borax in 20 cc. of water. The contents of the tube were then refrozen. To the contents of the tube were next charged 4 cc. of a solution prepared by dissolving 1 gram of potassium persulfate in 80 cc. of water. The contents of the tube were then refrozen, and the tube was next connected to a gas-transfer system and evacuated at liquid nitrogen temperature. To the frozen contents of the tube were added, by distillation, 1.02 grams of 1,1,3-trifluorobutadiene and 1.66 grams of 1,1-dichloro-2,2-difluoroethylene, which comprised a comonomeric mixture containing 45 mole percent 1,1,3-trifluorobutadiene and 55 mole percent 1,1-dichloro-2,2-difluoroethylene. After the contents of the tube were thoroughly frozen with liquid nitrogen, the tube was evacuated and sealed.

The polymerization tube and its contents were agitated in a temperature-regulated water-bath at 50° C. for a period of 72 hours. At the end of this time, the contents of the tube were coagulated by freezing. The coagulated product was then removed from the tube, washed with hot water and then dried to constant weight in vacuo at 35° C. A copolymeric rubbery product was obtained which was found, upon analysis, to comprise approximately 74 mole percent 1,1,3-trifluorobutadiene and the remaining major constituent, 1,1-dichloro-2,2-difluoroethylene, being present in an amount of approximately 15 mole percent. The copolymer was obtained in an amount corresponding to 31% conversion.

A sample of the raw copolymer was compression molded at 350° F. for a period of about 10 minutes. After molding, the sample remained flexible, retaining its rubbery characteristics. A volume increase of 30.2% was observed in the molded sample when tested by ASTM Designation D-471-49T, in ASTM Type II Fuel, consisting of isooctane (60% by volume), benzene (5% by volume), toluene (20% by volume) and xylene (15% by volume. Gehman stiffness of the molded sample of raw copolymer determined according to ASTM Designation D-1053-49T, was as follows: $T_2=-10°$ C.; $T_5=-19.5°$ C.; $T_{10}=-24.5°$ C.; $T_{100}=$below $-50°$ C.

*Example II*

Employing the procedure set forth in Example I and the same polymerization system, the tube was charged with 2.25 grams of 1,1,2-trifluorobutadiene and 2.75 grams of 1,1-dichloro-2,2-difluoroethylene which comprised a comonomer mixture containing 50 mole percent of each monomer.

The polymerization reaction was carried out at a temperature of 50° C. for a period of 22 hours. The resultant elastomeric product was worked-up in accordance with the same procedure set forth in Example I. A rubbery product was obtained and, upon analysis, was found to comprise approximately 90 mole percent, 1,1,2-trifluorobutadiene and the remaining major constituent, 1,1-dichloro-2,2-difluoroethylene, being present in an amount of approximately 10 mole percent. The copolymer was obtained in an amount corresponding to a 44% conversion.

A sample of the raw copolymer was compression molded at 350° C. for a period of 10 minutes. After molding, the sample retained its rubbery characteristics. A volume increase of 32.4% was observed in the molded sample when tested in the aforementioned ASTM Type II Fuel. Gehman stiffness of the molded sample of raw copolymer, determined as previously indicated, was as follows: $T_2=-6.5°$ C.; $T_5=-20°$ C.; $T_{10}=-24.5°$ C.; $T_{100}=$below $-50°$ C.

*Example III*

Employing the procedure set forth in Example I and the same polymerization system, except that the dodecyl mercaptan was eliminated from the system, the tube was charged with 2.87 grams of 1,1,3-trifluorobutadiene and 2.13 grams of 1-chloro-1-fluoroethylene, which comprised a comonomer mixture containing 50 mole percent of each monomer.

The polymerization reaction was carried out at a temperature of 50° C. for a period of 24 hours. The resultant elastomeric product was worked-up in accordance with the same procedure as set forth in Example I. A rubbery product was obtained and, upon analysis, was found to comprise approximately 81.5 mole percent 1,1,3-trifluorobutadiene and the remaining major constituent, 1-chloro-1-fluoroethylene, being present in an amount of approximately 18.5 mole percent. The copolymer was obtained in an amount corresponding to a 50% conversion.

A sample of the raw copolymer was compression molded at 250° F. for a period of 10 minutes. After molding, the sample remained rubbery. A volume increase of 13.2% was observed in the molded sample, when tested in the aforementioned ASTM Type II Fuel. Gehman stiffness of the molded sample of raw copolymer, determined as previously indicated, was as follows:

$T_2=+9.5°$ C.; $T_5=+0.5°$ C.; $T_{10}=-4°$ C.
$T_{100}=-11.5°$ C.

*Example IV*

Employing the procedure set forth in Example I and the same polymerization system, the tube was charged with 2.86 grams of 1,1,2-trifluorobutadiene and 2.14 grams of 1-chloro-1-fluoroethylene, which comprised a comonomer mixture containing 50 mole percent of each monomer.

The polymerization reaction was carried out at a temperature of 50° C. for a period of 23 hours. The resultant elastomeric product was worked-up in accordance with the same procedure as set forth in Example I. A rubbery product was obtained and, upon analysis, was found to comprise approximately 54 mole percent 1,1,2-trifluorobutadiene and the remaining major constituent, 1-chloro-1-fluoroethylene, being present in an amount of approximately 46 mole percent. The copolymer was obtained in an amount corresponding to a 92% conversion.

A sample of the raw copolymer was compression molded at 35° F. for a period of 10 minutes. After molding, the sample retained its rubbery characteristics. A volume increase of 72.9% was observed in the molded sample, when tested in the aforementioned ASTM Type II Fuel. Gehman stiffness of the molded sample of raw copolymer, determined as previously indicated, was as follows: $T_2=+6.5°$ C.; $T_5=-2°$ C.; $T_{10}=-9°$ C.; $T_{100}=-26.5°$ C.

*Example V*

A heavy-walled glass polymerization tube of about 20 ml. capacity was flushed with nitrogen and then charged with 5 cc. of a solution prepared by dissolving 5 grams of potassium stearate in 100 cc. of water. This solution was adjusted to a pH of 11 by the addition of potassium hydroxide. The contents of the tube were then frozen, and the tube was then charged with 4 cc. of a solution prepared by dissolving 1.0 gram of potassium persulfate in 80 cc. of water. The contents of the tube were then refrozen, and the tube was then charged with 1 cc. of a solution prepared by dissolving 0.4 gram of sodium metabisulfite in 20 cc. of water. The contents of the tube were then refrozen. To the frozen contents of the tube were then added, by distillation, 2.59 grams of 1,1,3-trifluorobutadiene and 2.41 grams of perfluoroethylene, which comprised a comonomer mixture containing 50 mole percent of each monomer.

The polymerization reaction was carried out at a temperature of 25° C. for a period of 96 hours. The resultant elastomeric product was worked-up in accordance with the same procedure as set forth in Example I. A rubbery product was obtained and, upon analysis, was found to comprise approximately 90.5 mole percent 1,1,3-trifluorobutadiene and the remaining major constituent, perfluoroethylene, being present in an amount of approximately 9.5 mole percent. The copolymer was obtained in an amount corresponding to a 21% conversion.

In a manner similar to that described above, perfluoroethylene is polymerized with 1,1,2-trifluorobutadiene to produce an elastomeric copolymer of these two monomers.

*Example VI*

A heavy-walled glass polymerization tube of about 20 ml. capacity was flushed with nitrogen and then charged with 5 cc. of a solution prepared by dissolving 0.75 gram of perfluorooctanoic acid in 100 cc. of water. The pH of this solution was adjusted to 9.5 by the addition of aqueous potassium hydroxide. The contents of the tube were then frozen, and the tube was then charged with 4 cc. of a solution prepared by dissolving 1 gram of potassium persulfate in 80 cc. of water. The contents of the tube were then refrozen, and the tube was then charged with 1 cc. of a solution prepared by dissolving 0.4 gram of sodium metabisulfite in 20 cc. of water. The contents of the tube were then refrozen, and the tube was next connected to a gas-transfer system and evacuated at liquid nitrogen temperature. To the frozen contents of the tube were added, by distillation, 4.54 grams of 1,1,3-trifluorobutadiene and 0.46 gram of 2-chloro-1,1-difluoroethylene, which comprised a comonomer mixture containing 90 mole percent of 1,1,3-trifluorobutadiene and 10 mole percent of 2-chloro-1,1-difluoroethylene.

The polymerization reaction was carried out at a temperature of 50° C. for a period of 24 hours. The resultant elastomeric product was worked-up in accordance with the same procedure as set forth in Example I. A copolymeric rubbery product was obtained which was found, upon analysis, to comprise approximately 98.5 mole percent 1,1,3-trifluorobutadiene and the remaining major constituent, 2-chloro-1,1-difluoroethylene, being present in an amount of approximately 1.5 mole percent. The copolymer was obtained in an amount corresponding to a 62% conversion.

A sample of the raw copolymer was compression molded at 250° F. for a period of 10 minutes. After molding, the sample remained rubbery. A volume increase of 12% was observed in the molded sample of raw copolymer when tested in the aforementioned ASTM Type II Fuel. Gehman stiffness of the molded sample of raw copolymer, determined as previously indicated, was as follows: $T_2 = -11.3°$ C.; $T_5 = -20.6°$ C.; $T_{10} = -23.8°$ C.; $T_{100} = -33°$ C.

In a manner similar to that described above, 2-chloro-1,1-difluoroethylene is polymerized with 1,1,2-trifluorobutadiene to produce an elastomeric copolymer of these two monomers.

*Example VII*

Employing the procedure set forth in Example VI and the same polymerization system (except that the potassium salt of the $C_8$ telomer acid of trifluorochloroethylene was substituted for the perfluorooctanoic acid), the tube was charged with 2.88 grams of 1,1,3-trifluorobutadiene and 2.12 grams of trifluoroethylene, which comprised a comonomer mixture containing 50 mole percent of each monomer.

The polymerization reaction was carried out at a temperature of 25° C. for a period of 36 hours. The resultant elastomeric product was worked-up in accordance with the same procedure as set forth in Example I. A rubbery product was obtained and was found, upon analysis, to comprise approximately 78 mole percent 1,1,3-trifluorobutadiene and the remaining major constituent, trifluoroethylene, being present in an amount of approximately 22 mole percent. The copolymer was obtained in an amount corresponding to an 8% conversion.

In a manner similar to that described above, trifluoroethylene is polymerized with 1,1,2-trifluorobutadiene to produce an elastomeric copolymer of these two monomers.

*Example VIII*

Employing the procedure set forth in Example VII and the same polymerization system, the tube was charged with 3.5 grams 1,1,3-trifluorobutadiene and 1.5 grams of vinyl fluoride, which comprised a comonomer mixture containing 50 mole percent of each monomer.

The polymerization reaction was carried out at a temperature of 25° C. for a period of 36 hours. The resultant elastomeric product was worked-up in accordance with the same procedure as set forth in Example I. A rubbery product was obtained and, upon analysis, was found to comprise approximately 72 mole percent 1,1,3-trifluorobutadiene and the remaining major constituent, vinyl fluoride, being present in an amount of approximately 28 mole percent. The copolymer was obtained in an amount corresponding to a 5% conversion.

In a manner similar to that described above, vinyl fluoride is polymerized with 1,1,2-trifluorobutadiene to produce an elastomeric copolymer of these two monomers. Similarly, vinylidene fluoride is copolymerized with either 1,1,2-trifluorobutadiene or 1,1,3-trifluorobutadiene to produce an elastomeric copolymer in each instance.

As previously indicated, the copolymeric compositions of the present invention possess highly desirable physical and chemical properties which make them useful for fabrication of a wide variety of thermoplastic articles, or for the application to various surfaces as protective coatings. In such uses, the raw elastomeric copolymer, such as is produced in accordance with the procedure set forth in the above examples, is extruded or pressed into sheets at temperatures between about 200° F. and about 650° F. and at a pressure between about 500 and about 15,000 pounds per square inch for a period of about 5 to about 60 minutes. Thereafter, various articles can be molded from preforms cut from sheets and extruded stock in the form of gaskets, diaphragms, packings, etc. In this respect, it is preferred in such applications, that the raw copolymer also includes various vulcanizing agents and fillers.

When employed as protective coatings on any of the surfaces previously described, the raw copolymeric composition is dissolved in any of the aforementioned solvents and is applied to the desired surfaces, employing such apparatus as a knife-spreader or a doctor-blade or a reverse-roll coater. The solvent, after the copolymeric coating composition has been applied to the surface, is permitted to evaporate. This may also be accomplished in the presence of elevated temperatures, if so desired.

In many applications, it is desirable to include in the copolymeric coating compositions, various vulcanizing agents. In the latter case, supplementary heat-treatment of the coating is required, either during the solvent-removal step or thereafter. After the solvent has been completely evaporated, and after the vulcanization step, if included, has been completed, the coated surface is ready for use. In this respect, it should be noted that the copolymeric coating composition may be applied to the surface either as a single coating or, if so desired, the protective coating may be built-up by the application of several layers, each layer being permitted to harden by solvent evaporation before the next layer is applied. Furthermore, if so desired, the protective coatings, or the copolymeric composition, when obtained in the form of sheets, may be suitably pigmented.

Other uses for the copolymeric compositions of the present invention reside in the fabrication of belting, hose, mountings, piston and pump-valves, sheet or valve disks, rolls, tubing, pressure-sensitive tape for electrical insulation purposes, grommets, or as adhesives for fastening a rubber surface to a metal or another rubber surface, and various uses as a dielectric medium.

Since certain changes may be made in carrying out the process of the present invention in producing the desired copolymeric compositions without departing from the scope of the invention, it is intended that all matter contained in the above description is to be interpreted as illustrative and not in a limiting sense.

I claim:

1. An elastomeric copolymer of between about 50 and about 99 mole percent of a trifluorobutadiene selected from the group consisting of 1,1,2-trifluorobutadiene and 1,1,3-trifluorobutadiene and correspondingly between about 1 and about 50 mole percent of a fluorinated ethylene selected from the group consisting of 1,1-dichloro-2,2-difluoroethylene, 1-chloro-1-fluoroethylene, perfluoroethylene, 2-chloro-1,1-difluoroethylene, and trifluoroethylene.

2. An elastomeric copolymer of between about 60 and about 90 mole percent of a trifluorobutadiene selected from the group consisting of 1,1,2-trifluorobutadiene and 1,1,3-trifluorobutadiene and correspondingly between about 10 and about 40 mole percent of a fluorinated ethylene selected from the group consisting of 1,1-dichloro-2,2-difluoroethylene, 1-chloro-1-fluoroethylene, perfluoroethylene, 2-chloro-1,1-difluoroethylene, and trifluoroethylene.

3. An elastomeric copolymer of between about 60 to about 90 mole percent of a trifluorobutadiene selected from the group consisting of 1,1,2-trifluorobutadiene and 1,1,3-trifluorobutadiene and correspondingly between about 10 and about 40 mole percent of perfluoroethylene.

4. An elastomeric copolymer of between about 60 to about 90 mole percent of a trifluorobutadiene selected from the group consisting of 1,1,2-trifluorobutadiene and 1,1,3-trifluorobutadiene and correspondingly between about 10 and about 40 mole percent of 1,1-dichloro-2,2-difluoroethylene.

5. An elastomeric copolymer of between about 60 to about 90 mole percent of a trifluorobutadiene selected from the group consisting of 1,1,2-trifluorobutadiene and 1,1,3-trifluorobutadiene and correspondingly between about 10 and about 40 mole percent of 1-chloro-1-fluoroethylene.

6. An elastomeric copolymer of between about 60 to about 90 mole percent of a trifluorobutadiene selected from the group consisting of 1,1,2-trifluorobutadiene and 1,1,3-trifluorobutadiene and correspondingly between about 10 and about 40 mole percent of 2-chloro-1,1-difluoroethylene.

7. An elastomeric copolymer of between about 60 to about 90 mole percent of a trifluorobutadiene selected from the group consisting of 1,1,2-trifluorobutadiene and 1,1,3-trifluorobutadiene and correspondingly between about 10 and about 40 mole percent of trifluoroethylene.

8. A process which comprises polymerizing a monomeric mixture of between about 10 and about 70 mole percent of a trifluorobutadiene selected from the group consisting of 1,1,2-trifluorobutadiene and 1,1,3-trifluorobutadiene and between about 90 and about 30 mole percent of a fluorinated ethylene selected from the group consisting of 1,1-dichloro-2,2-difluoroethylene, 1-chloro-1-fluoroethylene, perfluoroethylene, 2-chloro-1,1-difluoroethylene, and trifluoroethylene, in contact with a free radical forming polymerization promoter at a temperature between about −20° C. and about 120° C.

9. A process which comprises polymerizing a monomeric mixture of between about 25 and about 60 mole percent of a trifluorobutadiene selected from the group consisting of 1,1,2-trifluorobutadiene and 1,1,3-trifluorobutadiene and between about 75 and about 40 mole percent of a fluorinated ethylene selected from the group consisting of 1,1-dichloro-2,2-difluoroethylene, 1-chloro-1-fluoroethylene, perfluoroethylene, 2-chloro- 1,1-difluoroethylene, and trifluoroethylene, in contact with a free radical forming polymerization promoter at a temperature between about −20° C. and about 120° C.

10. The elastomeric copolymer of claim 3 in which the trifluorobutadiene is 1,1,3-trifluorobutadiene.

11. The elastomeric copolymer of claim 3 in which the trifluorobutadiene is 1,1,2-trifluorobutadiene.

12. The elastomeric copolymer of claim 4 in which the trifluorobutadiene is 1,1,3-trifluorobutadiene.

13. The elastomeric copolymer of claim 4 in which the trifluorobutadiene is 1,1,2-trifluorobutadiene.

14. The elastomeric copolymer of claim 5 in which the trifluorobutadiene is 1,1,3-trifluorobutadiene.

15. The elastomeric copolymer of claim 5 in which the trifluorobutadiene is 1,1,2-trifluorobutadiene.

16. The elastomeric copolymer of claim 6 in which the trifluorobutadiene is 1,1,3-trifluorobutadiene.

17. The elastomeric copolymer of claim 6 in which the trifluorobutadiene is 1,1,2-trifluorobutadiene.

18. The elastomeric copolymer of claim 7 in which the trifluorobutadiene is 1,1,3-trifluorobutadiene.

19. The elastomeric copolymer of claim 7 in which the trifluorobutadiene is 1,1,2-trifluorobutadiene.

References Cited in the file of this patent

UNITED STATES PATENTS

| | | |
|---|---|---|
| 2,479,367 | Joyce | Aug. 16, 1949 |
| 2,584,126 | Hanford | Feb. 5, 1952 |
| 2,750,431 | Tarrant et al. | June 12, 1956 |
| 2,793,201 | Gochenour et al. | May 21, 1957 |
| 2,837,503 | Lo | June 3, 1958 |
| 2,842,528 | Herbst et al. | July 8, 1958 |
| 2,843,575 | Hoyt | July 15, 1958 |